United States Patent [19] [11] 4,018,974
Andersson et al. [45] Apr. 19, 1977

[54] DIRECT CURRENT ARC FURNACE

[75] Inventors: Conny Andersson, Viken; Sven-Einar Stenkvist, Vasteras, both of Sweden

[73] Assignee: ASEA Aktiebolag, Vasteras, Sweden

[22] Filed: Dec. 11, 1975

[21] Appl. No.: 639,916

[30] Foreign Application Priority Data

Dec. 12, 1974 Sweden .............................. 7415575

[52] U.S. Cl. ................................................. 13/9 R
[51] Int. Cl.² .......................................... H05B 7/00
[58] Field of Search .............................. 13/9, 10, 12

[56] References Cited

UNITED STATES PATENTS 3,835,230   9/1974   Valchev ................................... 13/9

*Primary Examiner*—R. N. Envall, Jr.
*Attorney, Agent, or Firm*—Kenyon & Kenyon Reilly Carr & Chapin

[57] ABSTRACT

A DC arc furnace having a hearth through which electric power can be transmitted to a melt formed on the hearth to form a positive connection permitting the arcing electrode or electrodes to be negatively connected to a DC power source, to operate as a cathode with improved operational characteristics, is made with its hearth enclosure having one or more permanent openings required for the normal operation of any arc furnace, this opening being exemplified by a deslagging port through which slag is removed by tilting the furnace in the direction of the port. The hearth connection is unsuitable for use when the furnace is charged initially with solid metal, so at that time a starting electrode positively connected to the power source, must be inserted through the hearth enclosure and into contact with the charge, the arcing electrode or electrodes then melting down the charge and forming a melt on the hearth permitting the hearth connection to become effective, after which the starting electrode is removed from the furnace. This starting electrode is mounted outside of the furnace by a permanent mounting supporting the starting electrode movably so that it can be inserted through the permanent opening, such as the deslagging port, into contact with the charge of solid metal, and after performing its function, permitting the electrode to be removed through the permanent opening so that furnace operation can thereafter be carried out in the normal manner. In the case of a tilting furnace the furnace can be tilted for deslagging and ultimately for tapping of the melt.

2 Claims, 2 Drawing Figures

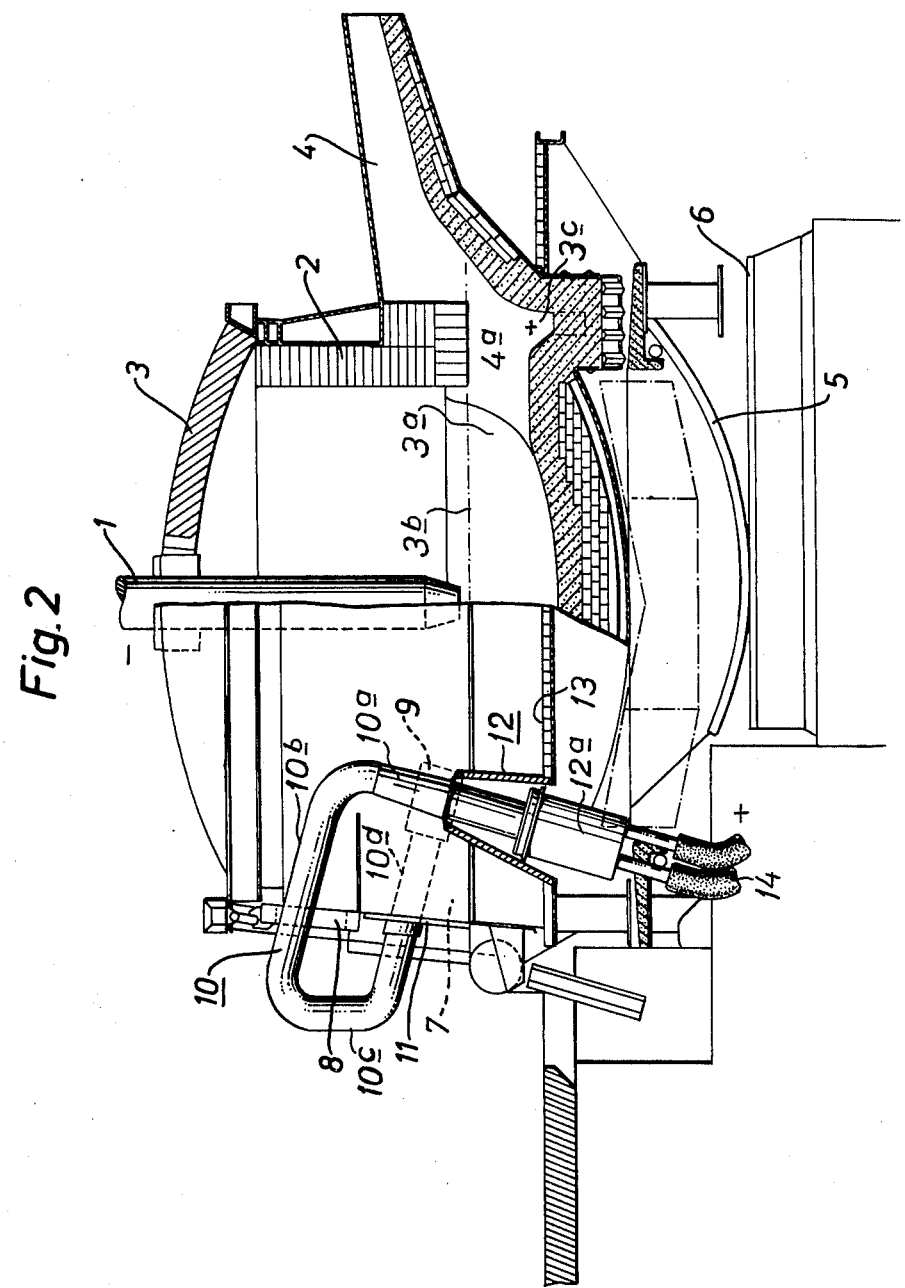

DIRECT CURRENT ARC FURNACE

BACKGROUND OF THE INVENTION

An electric furnace of arc type normally comprises a hearth having an enclosure formed by a side wall and a removable roof above the hearth, the roof being removed so the hearth can be charged with solid metal, such as scrap. After charging, the roof is replaced and one or more arcing electrodes are lowered through suitable openings formed in the roof, these electrodes serving first to melt down the solid metal and form a melt in the hearth and, thereafter, to heat the melt. The furnace can be tilted in opposite directions from a normal vertical position, and on opposite sides of the furnace's side wall, a deslagging port and a tapping port and spout, respectively, are positioned. These are permanent openings required for the normal operation of the furnace, the furnace being tilted towards the deslagging port for the removal of slag floating on the melt formed in the hearth, and, for tapping, being tilted towards the tapping port. The hearth enclosure's side wall may have other permanent openings, but the ports specifically mentioned are mandatory for all practical purposes. In the case of an arc furnace powered by alternating current, two or more arcing electrodes are used, depending on whether the power source is single or multi-phase, so there is no problem in connection with powering the electrodes for the melt-down of the initially charged solid metal or scrap.

However, in the case of a DC arc furnace it is usually necessary to provide some kind of hearth connection with one polarity of current, while the arcing electrode or electrodes are powered with the opposite polarity. Preferably the arcing electrodes are operated as cathodes, the hearth connection, therefore, being operated as the anode.

Various hearth connections are known and the hearth itself can be made of graphite, but this is extremely expensive. Therefore, it is preferable to make the hearth in the normal manner of electrically non-conductive refractory, although this requires the hearth connection to make electrical contact with a melt on the hearth throughout only a localized portion of the melt. Hearth connections of this type are known, a particularly advantageous form being disclosed by the Stenkvist U.S. Patent application Ser. No. 587,714, filed June 17, 1975. This localized contact-type of hearth connection, contacting the melt at what is essentially only a point compared to the overall hearth area, has the disadvantage that it is insufficient, if not ineffective, in getting adequate arcing power into an initially loaded charge of solid metal or scrap, to permit the arcing electrode or electrodes to melt down the charge to a melt on the hearth. The described type of hearth connection is fully effective only in the case of a melt in the hearth.

To overcome the problem of effecting a melt-down of solid metal or scrap in a DC arc furnace, the prior art has proposed the use of one or more starting electrodes which can temporarily be pushed into contact with the charge firmly to provide an effective contact with the charge during the melt-down, the starting electrode or electrodes then being withdrawn so that the thus-formed melt, effected by the arcing electrode or electrodes, can be processed and ultimately tapped. However, insofar as is known, the prior art has been silent concerning the manner of using the starting electrode or electrodes in a commercially practical manner.

The construction and operation of any electric arc furnace is inherently expensive. If the furnace has to be designed to accommodate one or more starting electrodes, usually proposed for insertion through the roof of the furnace in the manner of the normal arcing electrodes, that expense is increased to a commercially impractical degree. In addition to the normal arcing electrode openings through the roof, which are already expensive because they must be provided with water-cooled rings, through which the electrodes extend, and already permit the escape of the start-up explosion noise and smoke, at least one additional opening through the furnace roof must be provided. Being directly above the hearth where the melt-down is being effected, such troubles are substantially increased.

With the foregoing in mind, the object of the present invention is to provide a DC arc furnace with an arrangement for the use of at least one starting electrode, free from the objections connected with inserting the starting electrode through the furnace roof, and which does not require any modification of the usual electric furnace construction while permitting enjoyment of the advantages of what might be called the point-contact type of hearth connection and, particularly, the very effective form of such a type, disclosed by the previously-referred-to patent application.

SUMMARY OF THE INVENTION

According to the present invention, the above object is attained by providing means on the outside of the furnace enclosure for mounting the starting electrode movably so it can be inserted into the enclosure through the permanent opening described above, particularly the deslagging port, and into contact with the charge of solid metal on the hearth, for initially melting down the charge. The electrical connection thus established makes possible the use of the arcing electrode to obtain a melt-down, making the previously referred to hearth connection, fully effective. After the melt is obtained, so that the arc power is supplied via the arcing electrode and the hearth connection, the mentioned means permits removal of the starting electrode from the enclosure through the permanent opening, i.e., the deslagging port.

It has been found possible to mount the starting electrode permanently on the outside of the furnace enclosure and so that when the starting electrode is not in use, it may be moved to a position entirely free from the furnace enclosure so that the normal furnace operations may be effected, including all necessary tilting motions of the furnace. The starting electrode, mounting means can store the electrode in an out-of-the-way position insofar as the furnace proper is concerned, yet where it is available for immediate use when needed, it being contemplated that this mounting means be made as a permanent part of the furnace installation, although entirely free from the furnace itself.

The starting electrode could be mounted on a carriage with wheels running on rails aligned with the furnace's deslagging port. However, other arrangements for inserting the starting electrode linearly through the deslagging port are also possible. However, normal electric arc furnace design places the deslagging port at a height substantially above the normal melt level so that horizontal insertion of the starting electrode may not result in the electrode's working tip firmly engaging the solid metal or scrap when it is initially charged into the furnace and onto the hearth. This possible deficiency can be overcome by inserting the electrode at a downward angularity or diagonally downwardly to make certain that the electrode's tip can effect a firm engagement with a scrap pile on the melt.

Although such angular or diagonal electrode insertion is obviously desirable, this concept does eliminate the possibility of using a carriage running on track rails or otherwise horizontally guided.

However, the present invention provides a starting electrode of a special shape, the electrode, made of metal, extending upwardly, making a right angular turn, extending as a straight cantilever, then downwardly, and thereafter having an arcuate portion terminated by the electrode's working tip. The first described electrode portion is pivotally mounted. The electrode configuration is such that if the pivoted portion of the electrode is vertical, the electrode's end providing the working tip swings arcuately, its curved portion being concentric with its pivotal portion, and into and from the deslagging port horizontally. However, the angularity of the pivotal axis can be made substantially as desired, so it can be tilted with the result that what might be called the working end of the electrode, enters the deslagging port at a downward angularity or diagonally downwardly. The pivotal mounting means for the swinging electrode may be permanently positioned by the usual structure surrounding the electric arc furnace, and the position may be offset from the furnace and from the furnace's tilting direction so that there is no interference with deslagging or tapping operations, it being understood that during such operations, the electrode is swung away from the deslagging port, entirely free from the tilting furnace, for safely storing the electrode for further use.

BRIEF DESCRIPTION OF THE DRAWINGS

The presently preferred mode for carrying out this invention is illustrated in the case of a DC arc furnace having a single arcing electrode, although it could have more, two previously described localized or point-type of hearth connections, and using the deslagging port for the starting electrode's furnace entry and removal. The various figures are as follows:

FIG. 2 is a side view of the furnace with the right-hand side broken away and vertically sectioned, and with a portion of the steel work which always surrounds an electric arc furnace, also in vertical section, to show the electrode mounting arrangement.

DETAILED DESCRIPTION OF THE INVENTION

Figure 1:
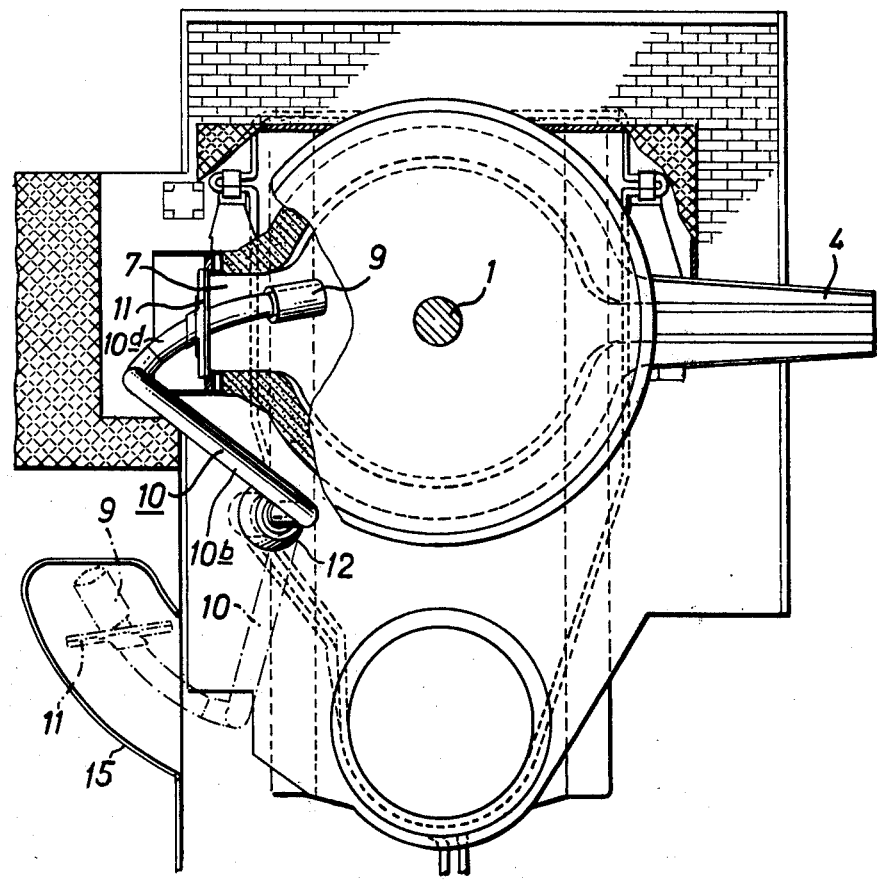
FIG. 1 is a top view of the furnace installation with the furnace portion above the deslagging port broken away to reveal the port and starting electrode by resorting to a horizontal sectional showing.

Having reference to the above-described drawings, the single arcing electrode 1, normally made of graphite, is shown extending downwardly concentrically within the furnace enclosure's cylindrical side wall 2, the side wall 2 having the usual removable roof 3 through which the electrode 1 extends via an opening of conventional design. Although not shown, the electrode 1 can be mounted in the usual way so that it can be lifted free from the cover 3 for removal of this cover so that the furnace can be charged with solid metal such as metal scrap. The side wall 2 and roof 3 provide a closed enclosure above the furnace's hearth 3a which is to contain the ultimately obtained melt at the level indicated by the broken line 3b. Only the inner end of the anodic hearth connection 3c is shown, but it can be seen that relative to the overall area of the hearth 3a, the contacting area of this connection 3c is small and that when scrap is piled above it and in loose contact with the connection, pressed only by the weight of the charge, that not very much electric power can be put into the charge, the power required for the formation of an effective arc between the bottom tip of the cathodic electrode 1 and the charge, being a substantial impossibility.

As is usual, this furnace is a tilting furnace and is capable of rocking in the direction of its tapping spout 4 so that a melt can be poured through this spout via the furnace's tap port 4a. For this purpose, the furnace is supported by rockers 5 on horizontal rails 6, so the furnace can tilt by rolling towards or away from the spout's direction.

The deslagging port is shown at 7, opposite the tapping opening 4a, the deslagging port normally being tightly closed against the escape of noise, smoke and fumes, by the usual vertically sliding door 8. During deslagging, the door 8 is lifted free from the port 7, the furnace is rolled over in the direction of the port 7 and the slag floating on the melt is removed through the port to fall downwardly through the usual opening in the floor construction surrounding the furnace.

Although the sliding door 8 can close the port 7 against the escape of fumes, noise, heat and the like, it normally is not, and probably cannot be made to withstand escape of a melt in the hearth 3a and, therefore, the port 7 must be placed at a level safely above the melt level 3b. Possibly it may be desirable to place the port at an even higher level, considering the slag that inevitably forms on the surface of the melt. It is because of this that horizontal insertion of a starting electrode would be very apt to be ineffective because its working tip could not be pressed against a scrap charge to be melted down, or at best would engage only the top portion of the pile.

In both figures, the starting electrode is shown with a tip 9. Keeping in mind that the solid scrap is charged to a level substantially higher than the normal melt level 3b; it can be seen from FIG. 2 that this tip is at a substantially lower level than the center line of the deslagging port 7. This new starting electrode 10, having the tip 9, is desirably introduced centrally through the deslagging port so that the electrode may be provided with its own deslagging port closure 11 in the form of a plate surrounding the electrode and large enough to effectively close the deslagging port against the escape of noise, heat, fumes, etc., during the melt-down operation when the arc noise and fumes caused by the arcing of the electrode 1 is particularly objectionable. This closure 11 can be fixed to the electrode 10 permanently, and at an appropriate angularity and with a size completely closing the port 7 when the electrode is in operation during start-up of the furnace.

The electrode 10 may be made of steel pipe throughout, excepting for its tip 9 which is preferably made of graphite, and although not shown, the steep pipe portion at least can be supplied internally with water-cooling.

Now, as to the electrode contour providing the unique action previously referred to, the electrode 10 starting out with a straight portion 10a, bends at a right angle to form an extending straight portion 10b, then bends downwardly at an angularity slightly sharper than a right angle, to form a short depending portion 10c and, form there, bending into its arcuate form 10d, or lever arm, which is concentric with the initially referred to straight portion 10a. It is this portion 10a that is pivotally mounted or journaled by a bearing member 12 welded up as an integral part of the metal portion of the flooring 13 which always surrounds an electric arc furnace and on which the operating personnel stand. As can be seen from FIG. 1, this pivotal mounting or bearing is offset from the furnace side wall 2 and, of course, the furnace itself, on one side of the furnace where it is free from the furnace when it rolls for deslagging or tapping.

The anodic electrical connection is indicated at 14 with the understanding that it is within the skill of the art to provide the necessary electrical insulation between the starting electrode and the arcing electrode. Also, although not shown in detail, the steel electrode 10 can be internally provided with water cooling up to its working tip 9.

As can be seen from FIG. 2, the starting portion 10a is mounted at an angularity towards the right-hand direction from the vertical, this resulting in the arcuately curved inserted portion 10b extending diagonally downwardly for the reason previously described. The dimensions of the various portions 10 to 10d depend, of course, upon the dimensions of the furnace to which the starting electrode is applied.

Although to avoid confusion no power means is shown for swinging or rotating the new starting electrode 10, the provision of such power means is also a matter well within the skill of the art. Manual swinging is possible but undesirable.

Normally, the new electrode 10 is swung to the position indicated by broken lines in FIG. 1. To protect the electrode's working tip 9, an appropriately curved house 15 may be made a part of the steel work construction surrounding the furnace. While in this house, the graphite tip 9 is protected against physical damage, and more importantly, the furnace operating personnel are protected, keeping in mind that the tip 9 will be extremely hot for a while after use of the electrode. The straight portion 10a and the bearing construction, very generally indicated at 12, may incorporate an arrangement generally indicated at 12a permitting raising and lowering of the straight section 10a and, therefore, of the entire electrode. In this manner the electrode can be swung out from the lateral opening of the house 15, raised to clear the house and swung towards and into the deslagging port 7 which is then completely closed against the escape of the furnace atmosphere/noise, by being plugged by the closure 11 fixed to the curved portion 10d, or lever arm, of the electrode. This placement of the starting electrode in its working position is, of course, done after the scrap or other solid metal has been piled on the hearth 3a, the removable cover 3 has been replaced, and the arcing electrode 1 positioned. If the starting electrode is swung by powered means, its tip 9 can be made to press firmly into the upper portion of the pile.

After the starting electrode is positioned, arcing power can be applied to the arcing electrode 1 and the starting electrode 10. The arc then forms and the solid material is melted down to form a melt and at that time the normal hearth connection 3c can be used, the starting electrode then being swung back to its position shown by broken lines in FIG. 1, stored and safely out of the way, the deslagging door 8 being then closed.

It can be seen that the electric furnace construction is not altered in any way. No extra openings are formed in the roof 3 or through the side wall 2. The furnace construction itself is not increased in cost as to its original construction, operation or servicing. There are no extra holes through which fumes, noise, heat and other objectionable conditions existing within the furnace, can escape.

In this connection, it is to be understood that if the furnace uses more than one arcing electrode 1, that they would be due to a demand met by the furnace designor and would be necessary in any event regardless of whether or not a starting electrode is to be used. Likewise, for various reasons the furnace side wall 2 might be provided with other permanent openings regardless of the use of the present invention, in which case this new electrode could be used for insertion through such other openings if located so that the pivotal mounting for the electrode can be offset to clear the furnace when it rolls or rocks for deslagging and tapping.

Only one hearth connection is shown but more might be used if desired. The new electrode may be made of any electrically conductive material having the conductivity and physical characteristics required. The new electrode is in effect a swinging cantilever and must be made with adequate stiffness to function as such, so steel has been suggested, protected by the graphite tip at the electrode's working end.

What is claimed is:

1. A DC arc furnace comprising a hearth through which electric power can be transmitted to a melt when formed on the hearth, an enclosure for the hearth, at least one arcing electrode extending through said enclosure for initially melting a charge of solid metal on said hearth and thereafter heating the resulting melt, said enclosure having at least one permanent opening required for normal operation of the furnace, a starting electrode through which electric power is transmitted to a charge of solid metal on said hearth until the charge is melted down to a melt on the hearth, and means on the outside of said enclosure for mounting said starting electrode movably so it can be inserted into said enclosure through said permanent opening and into contact with a charge of solid metal on said hearth for initially melting down the charge and for thereafter removing the starting electrode from the enclosure through the permanent opening, said means being provided by a pivotal mounting offset laterally from said enclosure and said starting electrode being made with a portion mounted by said pivotal mounting and formed so as to extend therefrom via a lever arm to a curved portion which can pass through said permanent opening by swinging via said lever arm, arcuately about said pivotal mounting.

2. The furnace of claim 1 in which a cover for said permanent opening is carried by said curved portion and closes the permanent opening around the curved portion when the latter is passed through the opening.

* * * * *